(12) United States Patent
Qian et al.

(10) Patent No.: US 7,933,212 B2
(45) Date of Patent: Apr. 26, 2011

(54) METHODS AND APPARATUS TO DIAGNOSE ENHANCED INTERIOR GATEWAY ROUTING PROTOCOL PROBLEMS IN NETWORKS

(75) Inventors: Zhiqiang Qian, Holmdel, NJ (US); Paritosh Bajpay, Edison, NJ (US); Michael John Zinnikas, North Brunswick, NJ (US); Jackson Liu, Middletown, NJ (US); Michele Macauda, Monroe, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 156 days.

(21) Appl. No.: 12/247,681

(22) Filed: Oct. 8, 2008

(65) Prior Publication Data

US 2010/0085879 A1  Apr. 8, 2010

(51) Int. Cl.
*G06F 11/00* (2006.01)
(52) U.S. Cl. ............... 370/242; 370/400; 709/224
(58) Field of Classification Search .......... 370/247–251, 370/400; 709/224
See application file for complete search history.

(56) References Cited

U.S. PATENT DOCUMENTS

| | | | |
|---|---|---|---|
| 5,159,685 A | 10/1992 | Kung | |
| 5,483,637 A | 1/1996 | Winokur et al. | |
| 6,662,221 B1 | 12/2003 | Gonda et al. | |
| 6,781,959 B1 | 8/2004 | Garakani et al. | |
| 7,010,718 B2 | 3/2006 | Ogawa et al. | |
| 7,257,741 B1 | 8/2007 | Palenik et al. | |
| 7,280,486 B2 * | 10/2007 | Suri | 370/248 |
| 7,420,927 B1 | 9/2008 | Garakani et al. | |
| 2003/0065967 A1 | 4/2003 | Garcia et al. | |
| 2004/0066747 A1 | 4/2004 | Jorgensen et al. | |
| 2005/0050096 A1 | 3/2005 | Gomes et al. | |
| 2006/0029075 A1 | 2/2006 | Sheppard et al. | |
| 2006/0075094 A1 | 4/2006 | Wen et al. | |
| 2006/0198310 A1 | 9/2006 | Stieglitz et al. | |
| 2008/0247392 A1 * | 10/2008 | White et al. | 370/392 |
| 2008/0270601 A1 * | 10/2008 | Ishikawa | 709/224 |
| 2009/0219823 A1 * | 9/2009 | Qian et al. | 370/250 |

* cited by examiner

*Primary Examiner* — Phuc Tran
(74) *Attorney, Agent, or Firm* — Hanley, Flight & Zimmerman, LLC

(57) ABSTRACT

Example methods and apparatus to diagnose enhanced interior gateway routing protocol (EIGRP) problems in networks are disclosed. A disclosed example method to identify whether an EIGRP problem is present in a network comprises automatically performing one or more tests of one or more routers of the network in response to a submitted trouble ticket, processing results of the one or more tests to automatically identify whether the EIGRP problem is present in the network, and automatically assigning the trouble ticket to a work center when the EIGRP problem is present in the network.

17 Claims, 8 Drawing Sheets

METHODS AND APPARATUS TO DIAGNOSE ENHANCED INTERIOR GATEWAY ROUTING PROTOCOL PROBLEMS IN NETWORKS

FIELD OF THE DISCLOSURE

This disclosure relates generally to networks and, more particularly, to methods and apparatus to diagnose enhanced interior gateway routing protocol (EIGRP) problems in networks.

BACKGROUND

Enterprise customers are increasingly adopting multiprotocol label switching (MPLS) based virtual private network (VPN) services to implement a communication network among their respective customer sites via a service provider's network. Such MPLS-based VPNs provide direct any-to-any reachability among an enterprise's customer sites. An enterprise customer may, for example, deploy voice over Internet protocol (VoIP) services and/or local area network (LAN) based data services to their customer sites via their respective VPN.

DETAILED DESCRIPTION

Example methods and apparatus to diagnose enhanced interior gateway routing protocol (EIGRP) problems in networks are disclosed. A disclosed example method to identify whether an EIGRP problem is present in a network includes automatically performing one or more tests of one or more routers of the network in response to a submitted trouble ticket, processing results of the one or more tests to automatically identify whether the EIGRP problem is present in the network, and automatically assigning the trouble ticket to a work center when the EIGRP problem is present in the network.

A disclosed example apparatus includes a data collector to perform one or more tests of one or more routers of a network, and a diagnoser to process results of the one or more tests to automatically identify whether an EIGRP problem is present in the network, and to automatically assign the trouble ticket to a work center when the EIGRP problem is present in the network.

In the interest of brevity and clarity, throughout the following disclosure, references will be made to an example communication system 100 and/or an example service provider network 105 of FIG. 1. However, the methods and apparatus described herein to diagnose EIGRP problems in networks are applicable to other types of systems and/or networks constructed using other network technologies, topologies and/or protocols, and/or to other types of communication sessions and/or communication applications.

Figure 1:
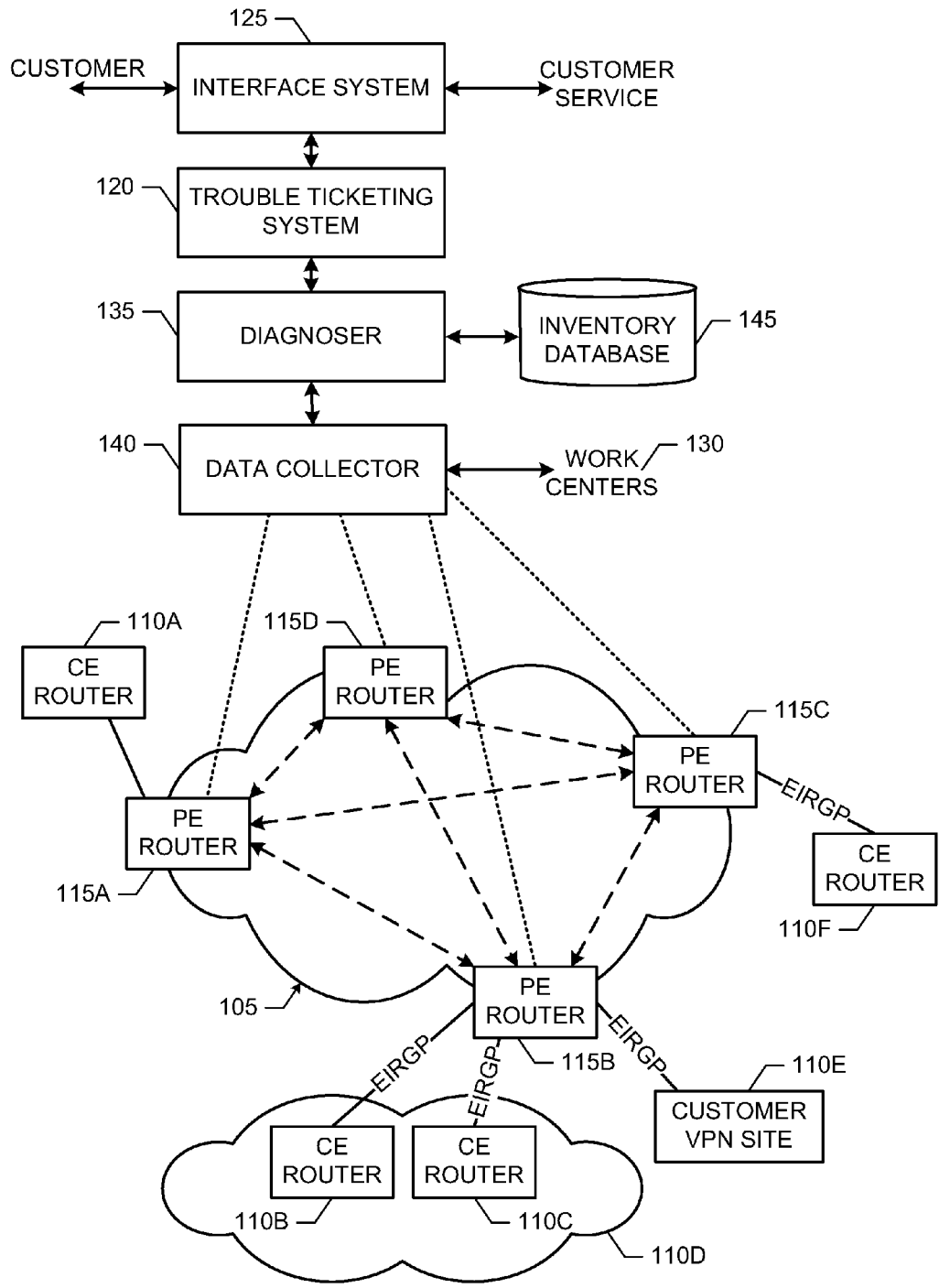
FIG. 1 is a schematic illustration of an example communication system constructed in accordance with the teachings of this disclosure.

FIG. 1 illustrates the example communication system 100. To facilitate communication between a plurality of customer edge (CE) routers and/or customer sites (six of which are designated at reference numerals 110A-F), the example communication system 100 of FIG. 1 includes the example service-provider network 105. The example service-provider network 105 of FIG. 1 includes a plurality of provider edge (PE) routers, four of which are designated at reference numerals 115A-D. The example PE routers 115A-D of FIG. 1 are communicatively coupled to each other via a plurality of communication paths that allow any of the PE routers 115A-D to communicate directly with any or a subset of the other PE routers 115A-D. The example PE routers 115A-D may be coupled in a full or partial mesh topology.

For each virtual private network (VPN) implemented by the service-provider network 105, each of the example PE routers 115A-D of FIG. 1 has a corresponding VPN routing and forwarding (VRF) table (not shown). The VRF table for a particular VPN defines which PE router(s) 110A-C are used to communicatively couple the various CE routers 110A-C of the VPN to the service-provider network 105. The VRF tables are used by the PE routers 115A-D to route and/or forward a packet received at a particular PE router 115A-D to its final destination.

To determine and/or select the next hop used to convey a particular packet to a particular destination, any or all of the example CE routers and/or customer sites 110A-F and/or the PE routers 115A-D of FIG. 1 perform route selection in accordance with any past, present and/or future interior gateway routing protocol (IGRP) such as the EIGRP defined by Cisco Systems Inc. EIGRP is a scalable distance-vector routing protocol, which includes optimizations to increase convergence time after topology changes, and to reduce bandwidth usage and the processing load of routers. Routers utilize EIGRP to select the next hop used to convey an MPLS packet to a particular destination. Each of the routers and/or sites 110A-F, 115A-D that supports EIGRP collects routing information in three tables: (a) a neighbor table that stores information regarding neighboring routers 110A-F, 115A-D that are directly accessible through directly connected network interfaces, (b) a routing table that stores actual routes to all destinations, (c) a topology table that stores an aggregation of routing tables obtained from all directly connected neighbors. The example CE routers and/or sites 110A-F and/or the example PE routers 115A-D of FIG. 1 distribute and collect routing information, and compute routing metrics in accordance with any past, present and/or future IGRP and/or EIGRP specification. Because the topology and/or routes through the example service-provider network 105 are typically transparent to the CE routers and/or customer sites 110A-F, EIGRP is traditionally used only for communication paths between CE routers and/or customer sites 110A-F and the PE routers 115A-D. In such instances, the PE routers 115A-D select routes within the service-provider network 105 based on any type and/or number of algorithm(s), logic, method(s) and/or rule(s) selected and/or implemented by a vendor of the PE routers 115A-D and/or an operator of the service-provider network 105.

When an EIGRP problem occurs, communication between the affected CE routers 110A-F and the PE routers 115A-D are lost and/or impaired, and customers experience a service interruption. When such service interruptions occur, the customer may submit a trouble ticket against the service-provider network 105 to any type of trouble ticketing system 120 via any type of interface system 125. In response to a submitted trouble ticket, the operator of the network 105 preferably troubleshoots and/or diagnoses the reported problem. Rapid resolution of submitted trouble tickets is important as delayed resolution of a reported problem may increase customer dissatisfaction and/or result in other portions of the example service provider network 105 also experiencing EIGRP problems.

To automatically diagnose reported EIGRP problems, the example communication system 100 of FIG. 1 includes a diagnoser 135 and a data collector 140. The example diagnoser 135 of FIG. 1 automatically and methodically diagnoses reported EIGRP problems by directing the example data collector 140 of FIG. 1 to execute diagnostic commands against the example PE routers 115A-D to collect information regarding the status and/or EIGRP configuration of the PE routers 115A-D. Based on data and/or information collected by the data collector 140 and rules implemented by the diagnoser 135, the example diagnoser 135 of FIG. 1: (a) determines additional tests to be run, (b) automatically determines the root cause of an EIGRP problem and assigns the reported trouble ticket to an appropriate work center 130 for resolution, and/or (c) determines that an actual EIGRP problem was not found and automatically closes the submitted trouble ticket. For example, when a layer 2 problem is identified, the submitted trouble ticket can be automatically routed to a work center 130 responsible for resolving layer 2 issues. Example processes that may be carried out to implement the example diagnoser 135 of FIG. 1 are described below in connection with FIGS. 2-11.

The commands that the example data collector 140 of FIG. 1 executes against the example PE routers 115A-D to obtain status information and/or EIGRP configuration information depends on the library and/or version of commands implemented by the vendor(s) of the PE routers 115A-D.

To store information related to the topology, the configuration and/or the devices of the example service-provider network 105, the example communication system 100 of FIG. 1 includes an inventory database 145. While diagnosing a reported EIGRP problem, the example diagnoser 135 of FIG. 1 queries the example inventory database 145 to obtain information related to the reported EIGRP problem. Example information identifies a list of PE routers 115A-D that form the customer circuit for which the EIGRP problem was reported. The example database 145 of FIG. 1 may be implemented using any number and/or type(s) of data structures, and may be stored in any number and/or type(s) of memory(-ies), memory device(s), volatile storage device(s), and/or non-volatile storage device(s).

The example interface system 125 of FIG. 1 implements one or more user interfaces that allow customers and/or customer-service representatives associated with the service provider network 105 to access the example trouble ticketing system 120. Example user interfaces are web-based interfaces that allow a user to generate, submit, search, cancel, and/or close for trouble tickets. The example interface system 125 of FIG. 1 can also send notices (e.g., via email and/or facsimile) to customers and/or customer-service representatives.

While an example communication system 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example trouble ticketing system 120, the example interface system 125, the example diagnoser 135, and/or the example data collector 140 of FIG. 1 may be implemented by hardware, software, firmware and/or any combination of hardware, software and/or firmware. Thus, for example, any of the example trouble ticketing system 120, the example interface system 125, the example diagnoser 135, and/or the example data collector 140 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a communication system may include interfaces, data structures, elements, processes and/or devices instead of, or in addition to, those illustrated in FIG. 1 and/or may include more than one of any or all of the illustrated interfaces, data structures, elements, processes and/or devices.

FIGS. 2-11 illustrate flowcharts representative of example processes that may be carried out to implement the example diagnoser 135 of FIG. 1. The example processes of FIGS. 2-11 may be carried out by a processor, a controller and/or any other suitable processing device. For example, the example processes of FIGS. 2-11 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 12). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 2-11 may be implemented using any combination(s) of ASIC(s), PLD(s), FPLD(s), discrete logic, hardware, firmware, etc. Also, some or all of the example processes of FIGS. 2-11 may instead be implemented manually or as any combination of any of the foregoing techniques, for example, any combination of firmware, software, discrete logic and/or hardware. Further, many other methods of implementing the example operations of FIGS. 2-11 may be employed. For example, the order of execution of the blocks may be changed, and/or one or more of the blocks described may be changed, eliminated, subdivided, or combined. Additionally, any or all of the example processes of FIGS. 2-11 may be carried out sequentially and/or carried out in parallel by, for example, separate processing threads, processors, devices, discrete logic, circuits, etc.

Figure 2:
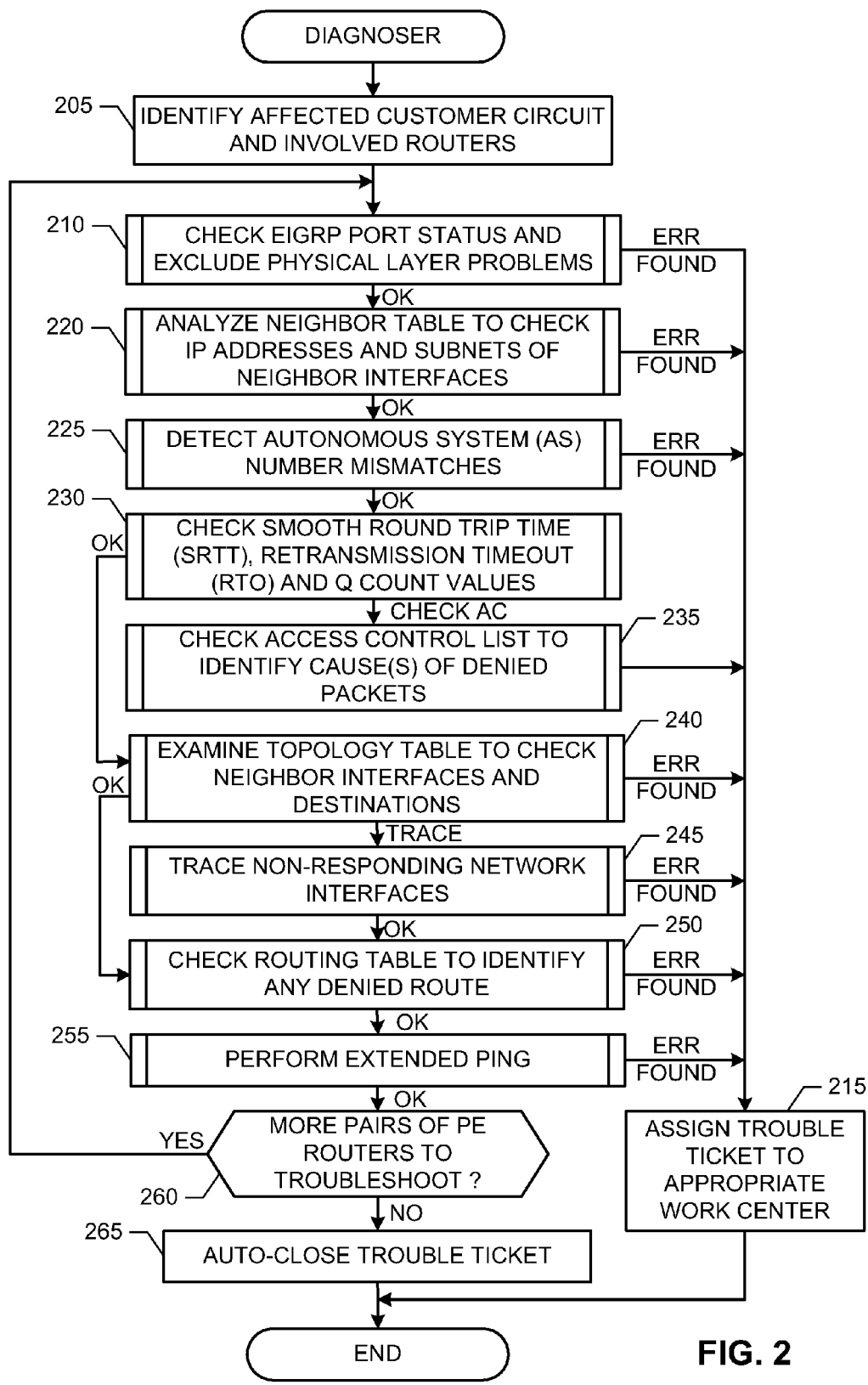
FIGS. 2-11 are flowcharts representative of example processes that may be carried out by, for example, a processor to diagnose EIGRP problems in networks such as an example service provider network of the example communication system of FIG. 1.

The example process of FIG. 2 begins when a trouble ticket is submitted for a particular customer circuit. The example diagnoser 135 queries the example inventory database 145 to identify the PE routers 115A-D associated with the customer circuit for which the trouble ticket is submitted (block 205). For a first pair of the identified PE routers 115A-D, the diagnoser 215 directs the example data collector 140 to collect port status information from the identified PE routers 115A-D, and determines whether a physical layer problem is present by, for example, carrying out the example process of FIG. 3 (block 210). If a physical layer problem is found (block 210), the diagnoser 135 assigns the trouble ticket to an appropriate work center 130 for resolution (block 215). Control then exits from the example process of FIG. 2.

Figure 4:
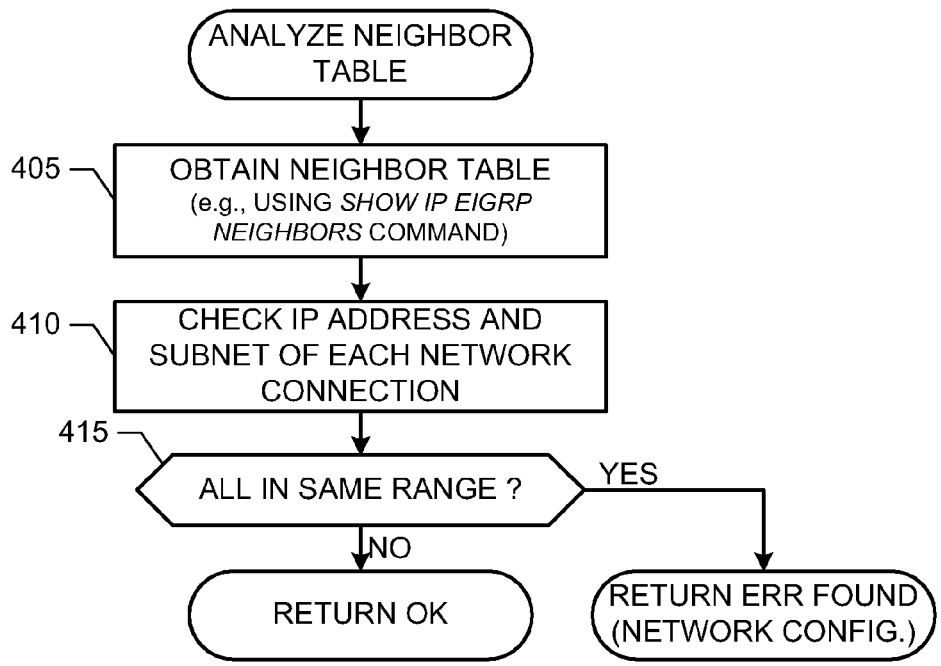

If no physical layer problem is found (block 210), the diagnoser 215 directs the example data collector 140 to collect neighbor tables from the pair of PE routers 115A-D, and determines whether an IP address or subnet mask mismatch is present by, for example, carrying out the example process of FIG. 4 (block 220). If an IP or subnet mismatch is found (block 220), the diagnoser 135 assigns the trouble ticket to an appropriate work center 130 for resolution (block 215).

Figure 5:
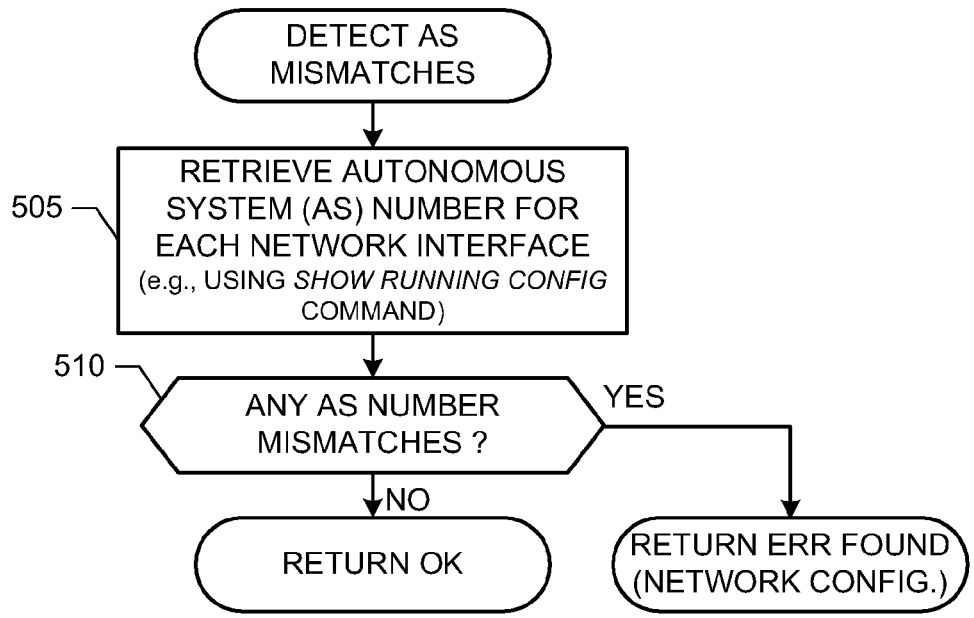

If no IP or subnet mismatch is found (block 220), the diagnoser 215 directs the example data collector 140 to collect or detect autonomous system (AS) number information from the pair of PE routers 115A-D, and determines whether AS number mismatch is present by, for example, carrying out the example process of FIG. 5 (block 225). If an AS number mismatch is found (block 225), the diagnoser 135 assigns the trouble ticket to an appropriate work center 130 for resolution (block 215).

Figure 6:
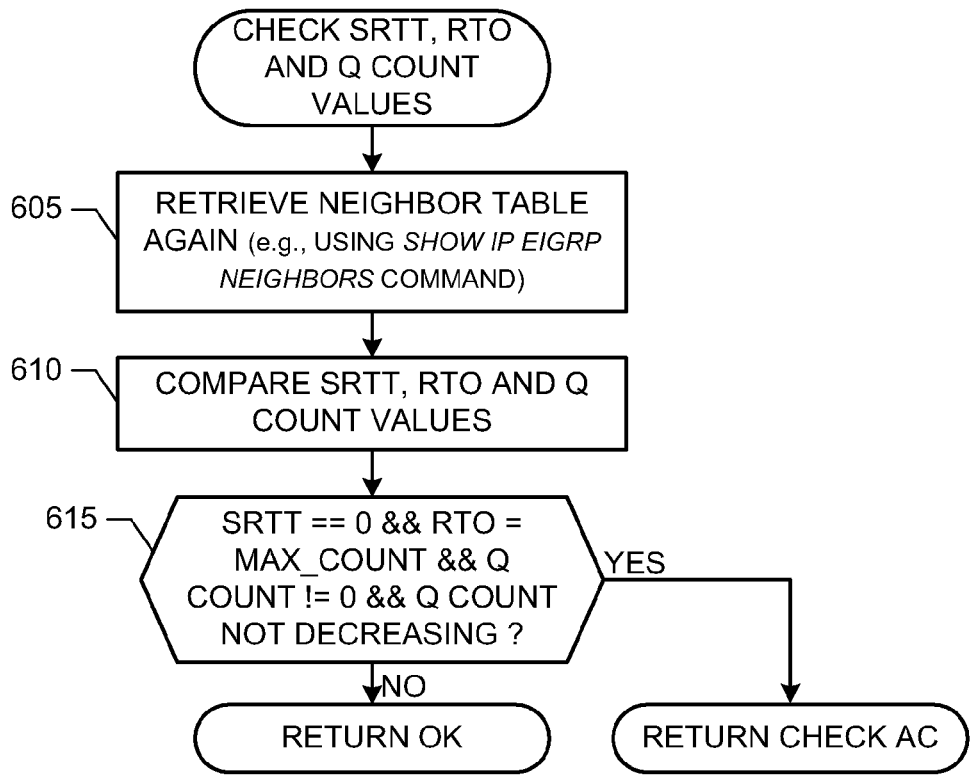

If no AS number mismatch is found (block 225), the diagnoser 215 directs the example data collector 140 to collect new copies of the neighbor tables from the pair of PE routers 115A-D, and compares the pairs of neighbor tables to determine whether an EIGRP configuration problem may be present by, for example, carrying out the example process of FIG. 6 (block 230). If an EIGRP configuration problem may be present (block 230), the diagnoser 215 directs the example data collector 140 to collect access control lists from the pair of PE routers 115A-D and identifies the cause of blocked EIGRP packets by, for example, carrying out the example process of FIG. 7 (block 235). Based on the identified cause of the block EIGRP packets (block 235), the diagnoser 135 assigns the trouble ticket to an appropriate work center 130 for resolution (block 215).

Figure 8:
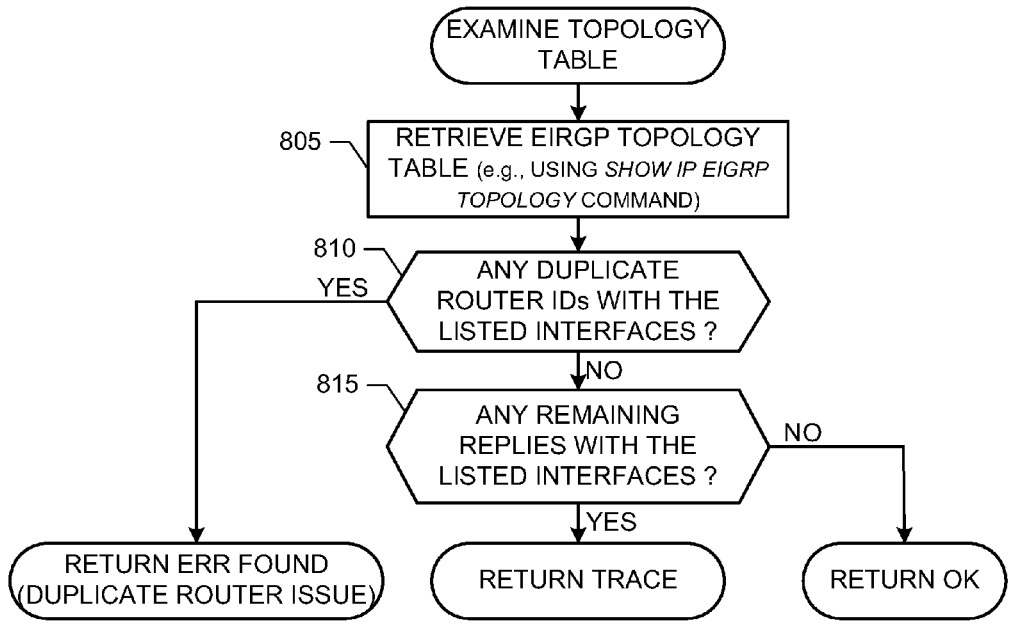

Returning to block 230, if a potential EIGRP problem is not identified based on the pairs of neighbor tables (block 230), the diagnoser 215 directs the example data collector 140 to collect topology from the pair of PE routers 115A-D, and checks neighbor interfaces and destinations by, for example, carrying out the example process of FIG. 8 (block 240). If a neighbor interface and/or destination problem is found (block 240), the diagnoser 135 assigns the trouble ticket to an appropriate work center 130 for resolution (block 215).

Figure 9:
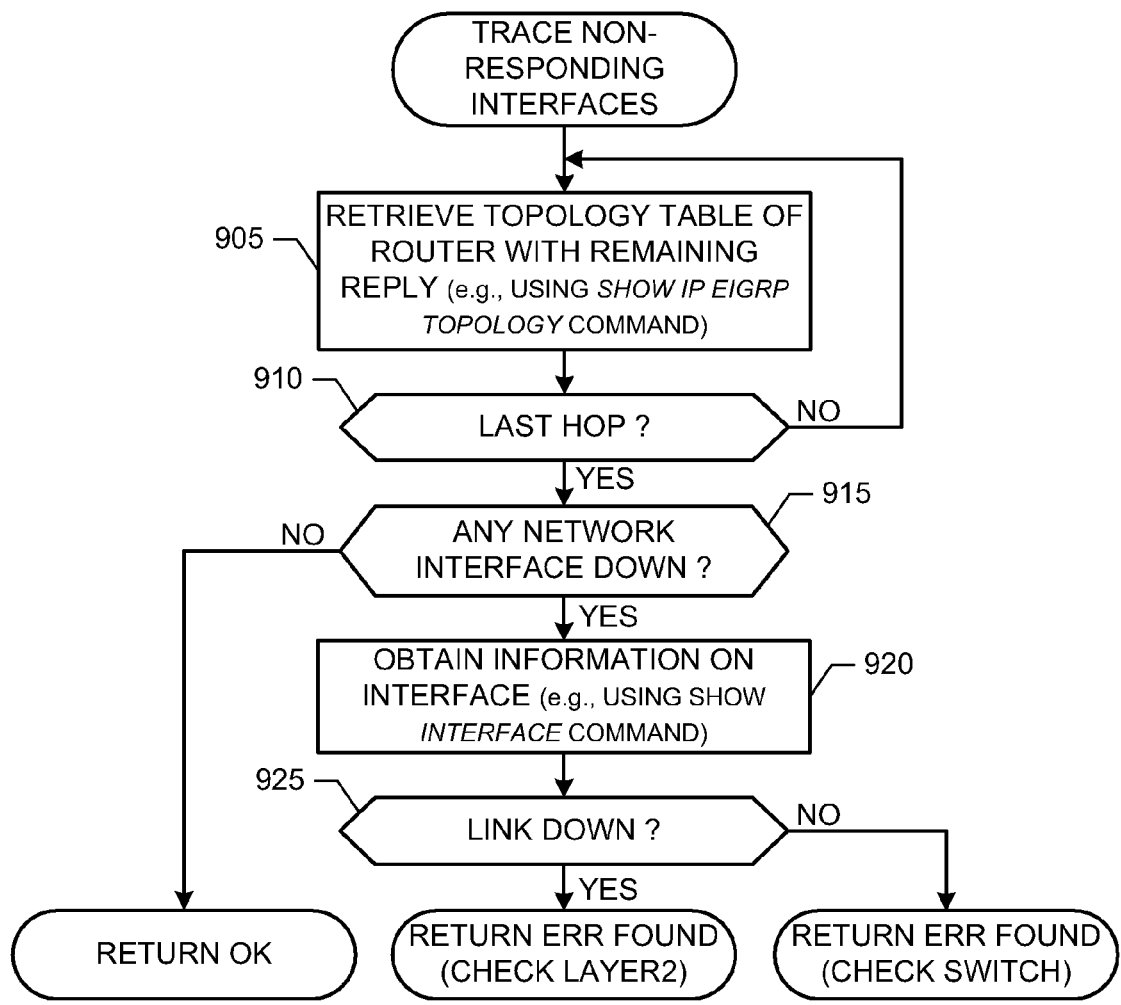

Returning to block 240, if a remaining EIGRP reply is found (block 240), the diagnoser 215 directs the example data collector 140 to collect topology from additional PE routers 115A-D, and traces the cause of the remaining EIGRP reply by, for example, carrying out the example process of FIG. 9 (block 245). If the trace identifies a problem (block 245), the diagnoser 135 assigns the trouble ticket to an appropriate work center 130 for resolution (block 215). If the trace does not identify a problem (block 245), control proceeds to block 250 to check routing tables.

Figure 10:
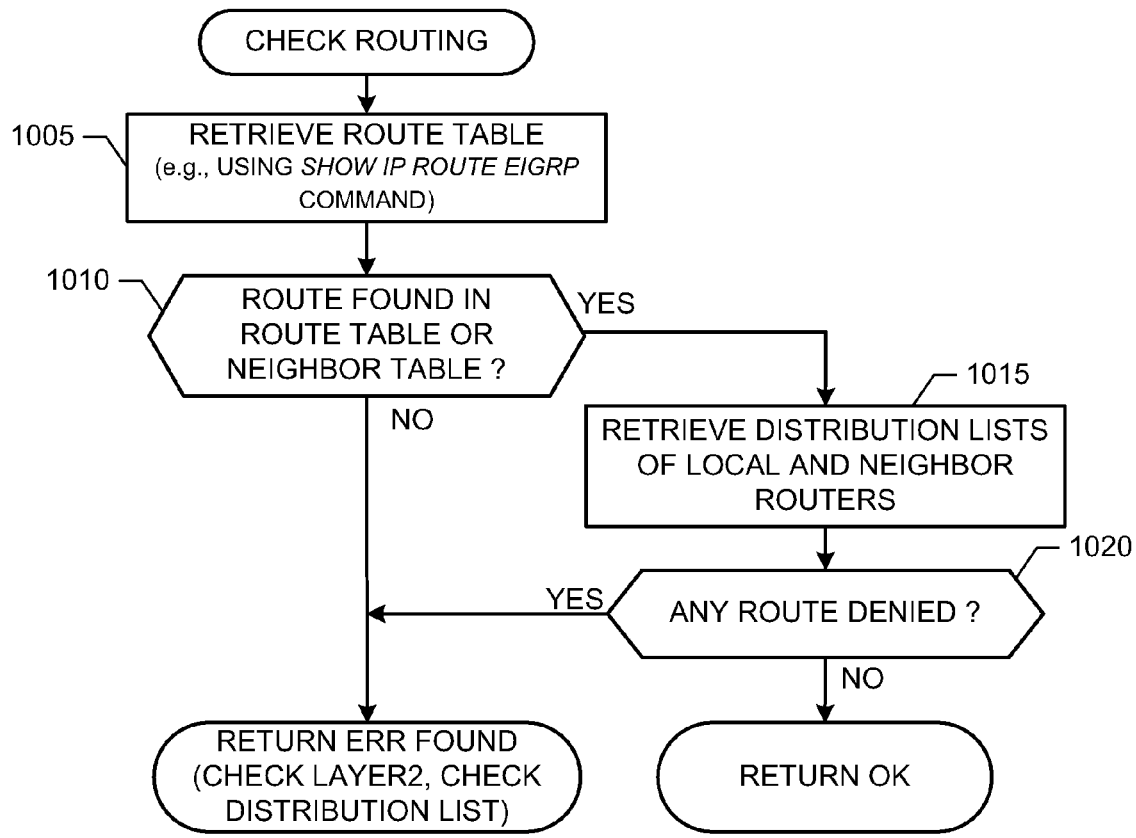

Returning to block 240, if no problem is identified at block 240, the diagnoser 215 directs the example data collector 140 to collect routing tables from the pair of PE routers 115A-D, and checks for denied routes by, for example, carrying out the example process of FIG. 10 (block 250). If a denied route problem is found (block 250), the diagnoser 135 assigns the trouble ticket to an appropriate work center 130 for resolution (block 215).

Figure 11:
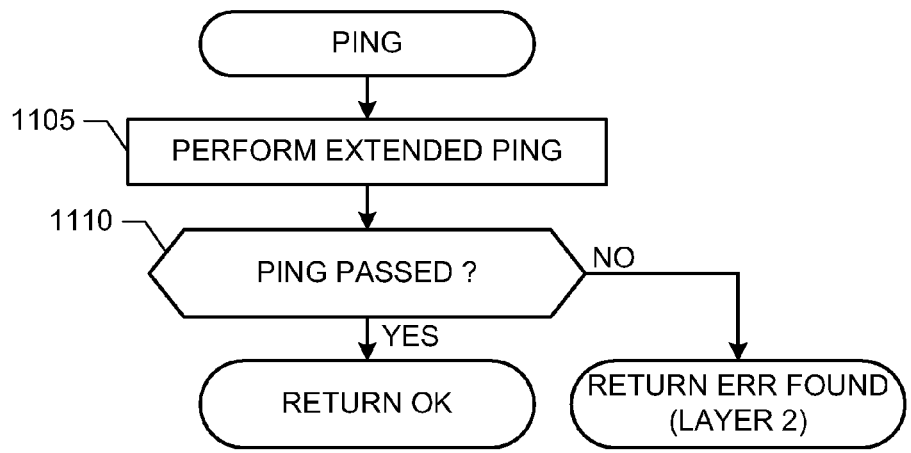

If a denied route problem is not found (block 250), the diagnoser 135 directs the data collector 140 to initiate an extended ping test of the customer's circuit by, for example, carrying out the example process of FIG. 11 (block 255). If the extended ping test identifies a problem (block 255), the diagnoser 135 assigns the trouble ticket to an appropriate work center 130 for resolution (block 215).

If the extended ping test does not identify a problem (block 255), the diagnoser 135 determines whether additional pairs of PE routers 115A-D need to be checked for the customer's circuit (block 260). If additional pairs of PE routers 115A-D need to be tested (block 260), control returns to block 210 to test the next pair of PE routers 115A-D. If no additional pairs of PE routers 115A-D remain to be tested (block 260), the diagnoser 135 directs the trouble ticketing system 120 to automatically close the submitted trouble ticket (block 265). Control then exits from the example process of FIG. 2.

Figure 3:
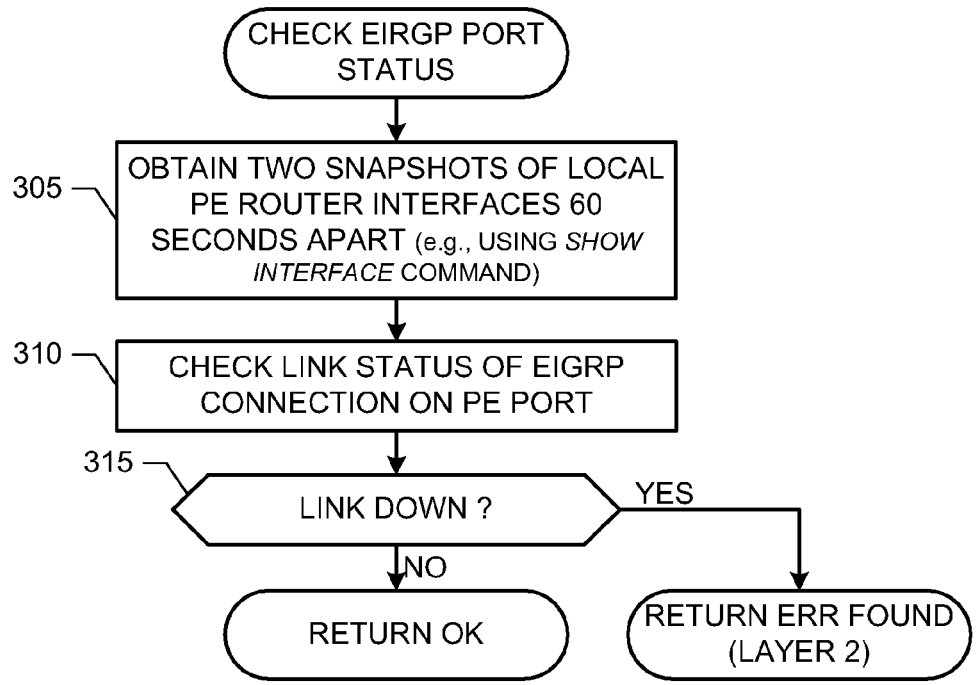

The example process of FIG. 3 may be carried out to check EIGRP port status for a PE router 115A-D. The example process of FIG. 3 begins with the example data collector 140 obtaining two snapshots of the interface of a PE router 115A-D 60 seconds apart by, for example, executing the "show interface" command against the PE router 115A-D (block 305). Based on the values returned by the PE router 115A-D to the data collector 140, the diagnoser 135 checks the status of the EIGRP connection on the interface (block 310). If the interface and/or the related link are down (block 315), control exits from the example process of FIG. 3 returning "err found" indicating that a layer 2 problem was identified, which needs to be resolved by an appropriate work center 130. If the interface and/or the related link are not down (block 315), control exits from the example process of FIG. 3 returning "ok" indicating that no layer 2 problem was identified.

The example process of FIG. 4 may be carried out to analyze neighbor tables. The example process of FIG. 4 begins with the example data collector 140 obtaining the neighbor table of a PE router 115A-D by, for example, executing the "show ip eigrp neighbors" command against the PE router 115A-D (block 405). The diagnoser 135 checks the IP address and the subnet mask of each network connection (block 410). If the IP address and the subnet mask for each connection are not in the same range (block 415), control exits from the example process of FIG. 4 returning "err found" indicating that a IP configuration problem was identified, which needs to be resolved by an appropriate work center 130. If an IP and subnet mask mismatch is not found (block 415), control exits from the example process of FIG. 4 returning "ok" indicating that no IP configuration problem was identified.

The example process of FIG. 5 may be carried out to detect AS mismatches. The example process of FIG. 5 begins with the example data collector 140 retrieving the AS number for each interface of a PE router 115A-D by, for example, executing the "show running config" command against the PE router 115A-D (block 505). If the diagnoser 135 identifies an AS number mismatch (block 510), control exits from the example process of FIG. 5 returning "err found" indicating that a network configuration problem was identified, which needs to be resolved by an appropriate work center 130. If an AS mismatch is not found (block 510), control exits from the example process of FIG. 5 returning "ok" indicating that no network configuration problem was identified.

The example process of FIG. 6 may be carried out to verify a neighbor table. The example process of FIG. 6 begins with the example data collector 140 obtaining another copy of the neighbor table for a PE router 115A-D by, for example, executing the "show ip eigrp neighbors" command against the PE router 115A-D (block 605). The diagnoser 135 compares the SRTT, RTO and Q count values from this additional copy of the neighbor table to the neighbor table obtained via the example process of FIG. 4 (block 610). If the SRTT equals zero, the RTO equals its maximum value, Q count is not zero, and Q count is not decreasing (block 615), control exits from the example process of FIG. 6 returning "check AC" indicating that an access control list problem may be present. If at least one of these conditions is not present (block 615), control exits from the example process of FIG. 6 returning "ok" indicating that no IP configuration problem was identified.

Figure 7:
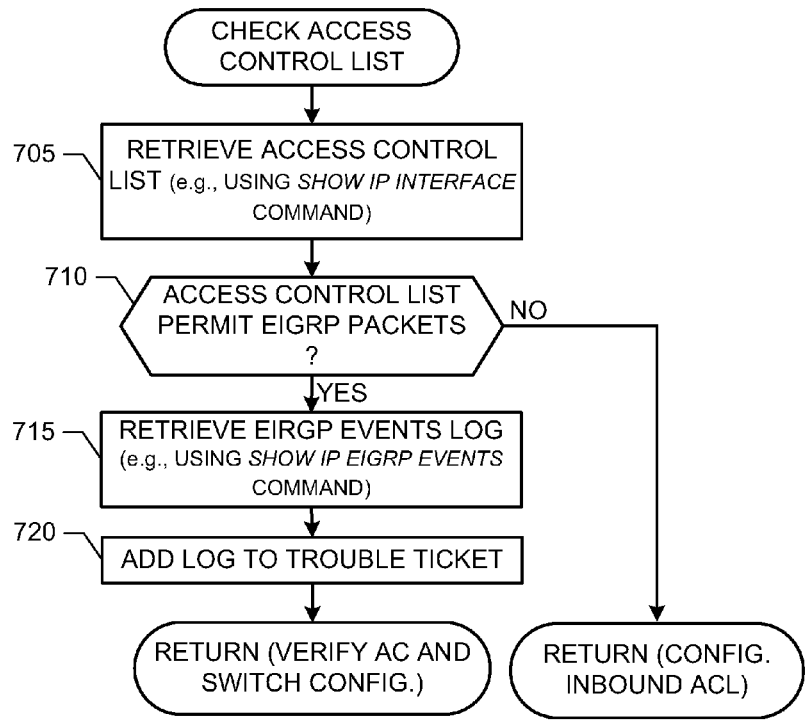

The example process of FIG. 7 may be carried out to check an access control list. The example process of FIG. 7 begins with the example data collector 140 obtaining the access control list for a PE router 115A-D by, for example, executing the "show ip interface" command against the PE router 115A-D (block 705). If the access control list indicates that EIGRP packets are allowed (block 710), control exits from the example process of FIG. 7 returning "configure inbound ACL" indicating that an appropriate work center 130 needs to resolve an inbound access control list problem.

If the access control list indicates that EIGRP packets are not allowed (block 710), the data collector 140 retrieves the EIGRP events log for the PE router 115A-D by, for example, executing the "show ip eigrp events" command against the PE router 115A-D (block 715). The diagnoser 135 adds the retrieved EIGRP events log to the submitted trouble ticket (block 720). Control then exits from the example process of FIG. 7 returning "verify AC and switch configuration" indicating that an appropriate work center 130 should an access control list and/or switch configuration problem needs to be resolve.

The example process of FIG. 8 may be carried out to verify a topology table. The example process of FIG. 8 begins with the example data collector 140 retrieving a topology table for a PE router 115A-D by, for example, executing the "show ip eigrp topology" command against the PE router 115A-D (block 805). If the diagnoser 135 identifies a duplicate router ID for any of the interfaces of the PE router 115A-D (block 810), control exits from the example process of FIG. 8 returning "err found" indicating that a duplicate router issue was identified. If a duplicate router is not identified (block 810), the diagnoser 135 determines whether any of the listed interfaces have remaining EIGRP replies (block 815). If a remaining EIGRP reply remains (block 815), control exits from the example process of FIG. 8 returning "trace" indicating that a remaining reply trace should be performed. If there are no remaining EIGRP replies (block 815), control exits from the example process of FIG. 8 returning "ok" indicating that a topology list problem was not found.

The example process of FIG. 9 may be carried out to trace for non-responding interfaces. The example process of FIG. 9 begins with the example data collector 140 retrieving a topology table for a PE router 115A-D having a remaining EIGRP reply by, for example, executing the "show ip eigrp topology" command against the PE router 115A-D (block 905). The data collector 140 continues tracing the topology table until the last hop is reached (block 910). If no network interface of the PE router 115A-D is down (block 915), control exits from the example process of FIG. 9 returning "ok" indicating that the trace did not identify a problem.

If a network interface is down (block 915), the data collector 140 obtains information on the interface by, for example, executing the "show interface" command against the interface (block 920). If the link associated with the interface is down (block 925), control exits from the example process of FIG. 9 returning "check layer2" indicating that an appropriate work center 130 needs to resolve a layer 2 problem. If the link associated with the interface is not down (block 925), control exits from the example process of FIG. 9 returning "check switch" indicating that an appropriate work center 130 needs to resolve a configuration problem for the PE router 115A-D.

The example process of FIG. 10 may be carried out to check a routing table. The example process of FIG. 10 begins with the example data collector 140 retrieving a routing table for a PE router 115A-D by, for example, executing the "show ip route eigrp" command against the PE router 115A-D (block 1005). If a route is found in the route table or neighbor table (block 1010), control exits from the example process of FIG. 10 returning "err found" indicating that an appropriate work center 130 needs to resolve a layer 2 problem.

If a route is found (block 1010), the data collector 140 retrieves distribution list of local and neighbor PE routers 115A-D (block 1015). If any of the distribution lists indicate a route denied (block 1020), control exits from the example process of FIG. 10 returning "err found" indicating that an appropriate work center 130 needs to resolve a distribution list problem. If there are no denied routes (block 1020), control exits from the example process of FIG. 10 returning "ok" indicating that no routing problems were found.

The example process of FIG. 11 may be carried out to perform an extended ping test. The example process of FIG. 11 begins with the example data collector 140 initiating an extended ping test for the customer's circuit (block 1105) between one of the PE routers 115A-D and a customer site or a CE router 111A-F associated with the customer's circuit. If the extended ping test was not successful (block 1110), control exits from the example process of FIG. 11 returning "err found" indicating that an appropriate work center 130 needs to resolve a layer 2 problem. If the extended ping test is successful (block 1110), control exits from the example process of FIG. 10 returning "ok" indicating that a layer 2 problem was not found.

Figure 12:
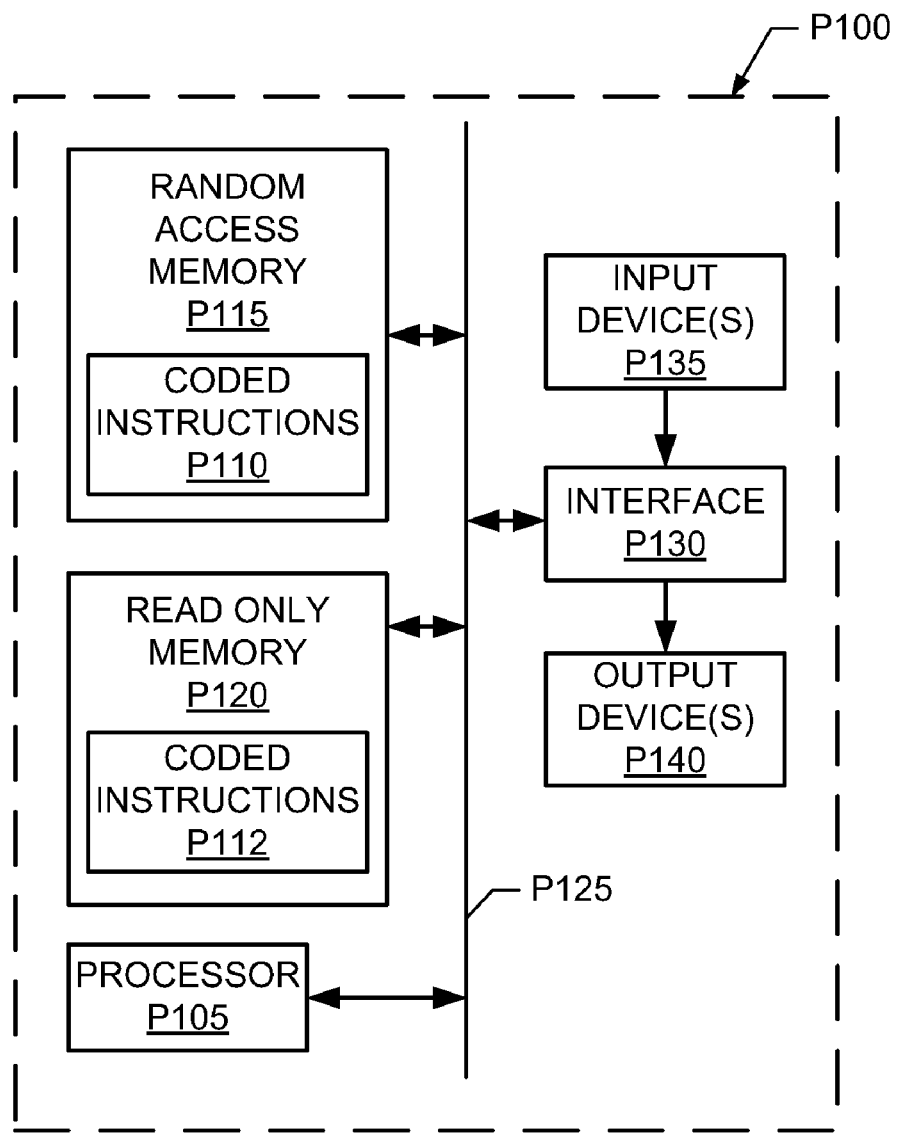
FIG. 12 is a schematic illustration of an example processor platform that may be used and/or programmed to carry out any or all of the example processes of FIGS. 2-11, and/or to implement any or all of the example methods and apparatus described herein.

FIG. 12 is a schematic diagram of an example processor platform P100 that may be used and/or programmed to implement any or all of the example trouble ticketing system 120, the example interface system 125, the example diagnoser 135, and/or the example data collector 140 of FIG. 1. For example, the processor platform P100 can be implemented by one or more general-purpose processors, processor cores, microcontrollers, etc.

The processor platform P100 of the example of FIG. 12 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 2-11 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example inventory database 145 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example input devices P135 and the example output devices P140 may be used to implement an interface between the example data collector 140 and the example PE routers 115A-D.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to identify whether an enhanced interior gateway routing protocol (EIGRP) problem is present in a network, the method comprising:
   automatically performing one or more tests of one or more routers of the network in response to a submitted trouble ticket;
   processing results of the one or more tests to automatically identify whether the EIGRP problem is present in the network;
   automatically assigning the trouble ticket to a work center when the EIGRP problem is present in the network;
   wherein the one or more tests comprise an EIGRP port status check, a comparison of two successive neighbor tables associated with a provider edge router port, and an extended ping test; and
   wherein processing results of the one or more tests comprises:
      analyzing a first value obtained from the EIGRP port status check to determine whether a communication path is operative;
      comparing Q count values from respective ones of the successive neighbor tables; and
      determining whether the extended ping test was successful.

2. A method as defined in claim 1, further comprising automatically closing the trouble ticket when the EIGRP problem is not present in network.

3. A method as defined in claim 1, further comprising selecting the work center based on a type of the EIGRP problem.

4. A method as defined in claim 1, further comprising:
   identifying a customer circuit based on the submitted trouble ticket; and
   identifying a pair of provider edge (PE) routers associated with the identified customer circuit, wherein the one or more tests are performed on the identified pair of PE routers.

5. A method as defined in claim 1, wherein the EIGRP problem is not present in the network when the communication path is operative, the Q count values are decreasing over time, and the extended ping test was successful.

6. A method to identify whether an enhanced interior gateway routing protocol (EIGRP) problem is present in a network, the method comprising:
   automatically performing one or more tests of one or more routers of the network in response to a submitted trouble ticket;
   processing results of the one or more tests to automatically identify whether the EIGRP problem is present in the network;
   automatically assigning the trouble ticket to a work center when the EIGRP problem is present in the network;
   wherein the one or more tests comprise an EIGRP port status check, a comparison of two successive neighbor tables associated with a provider edge router port, and an extended ping test; and
   wherein the one or more tests further comprise at least one of a check for compatible subnet masks listed in a first of the neighbor tables, a check for an autonomous system number mismatch, a check that an access control list permits EIGRP packets, a trace of a non-responding network interface, a check of a routing table to identify a denied route, or a check of a topology table to verify neighbor interfaces.

7. An apparatus comprising:
   a data collector to perform one or more tests of one or more routers of a network in response to a submitted trouble ticket; and
   a diagnoser to process results of the one or more tests to automatically identify whether an enhanced interior gateway routing protocol (EIGRP) problem is present in the network, and to automatically assign the trouble ticket to a work center when the EIGRP problem is present in the network; and
   an interface system to receive the trouble ticket, the diagnoser to direct the data collector to perform the one or more tests and to process the results of the one or more tests when the trouble ticket is received.

8. An apparatus as defined in claim 7, wherein the diagnoser is to automatically close the trouble ticket when the EIGRP problem is not present in the network.

9. An apparatus as defined in claim 7, wherein the diagnoser is to select the work center based on a type of the EIGRP problem.

10. An apparatus as defined in claim 7, wherein the diagnoser is to identify a customer circuit based on the submitted trouble ticket, and identify a pair of provider edge (PE) routers associated with the identified customer circuit, the data collector is to perform the one or more tests on the identified pair of PE routers.

11. An apparatus as defined in claim 7, wherein the one or more tests comprise an EIGRP port status check, a comparison of two successive neighbor tables associated with a provider edge router port, and an extended ping test.

12. An apparatus as defined in claim 11, wherein the diagnoser to:
   analyze a first value obtained from the EIGRP port status check to determine whether a communication path is operative;
   compare Q count values from respective ones of the successive neighbor tables; and
   determine whether the extended ping test was successful.

13. An article of manufacture as defined in claim 7, wherein the machine readable instructions, when executed, cause the machine to at least automatically close the trouble ticket when the EIGRP problem is not present in network.

14. An article of manufacture as defined in claim 7, wherein the machine readable instructions, when executed, cause the machine to at least select the work center based on a type of the EIGRP problem.

15. A tangible article of manufacture excluding propagating signals and storing machine readable instructions that, when executed, cause a machine to at least:
   automatically perform one or more tests of one or more routers of the network in response to a submitted trouble ticket;
   process results of the one or more tests to automatically identify whether an extended interior gateway routing protocol (EIGRP) problem is present in the network;
   automatically assign the trouble ticket to a work center when the EIGRP problem is present in the network;
   identify a customer circuit based on the submitted trouble ticket; and identify a pair of provider edge (PE) routers associated with the identified customer circuit, wherein the one or more tests are performed on the identified pair of PE routers.

16. A tangible article of manufacture excluding propagating signals and storing machine readable instructions that, when executed, cause a machine to at least:

automatically perform one or more tests of one or more routers of the network in response to a submitted trouble ticket, wherein the one or more tests comprise an EIGRP port status check, a comparison of two successive neighbor tables associated with a provider edge router port, and an extended ping test;

process results of the one or more tests to automatically identify whether an extended interior gateway routing protocol (EIGRP) problem is present in the network; and automatically assign the trouble ticket to a work center when the EIGRP problem is present in the network.

17. An article of manufacture as defined in claim 16, wherein the machine readable instructions, when executed, cause the machine to process results of the one or more tests by at least:

analyzing a first value obtained from the EIGRP port status check to determine whether a communication path is operative;

comparing Q count values from respective ones of the successive neighbor tables; and determining whether the extended ping test was successful.

\* \* \* \* \*